(12) United States Patent
Hiramoto et al.

(10) Patent No.: US 6,977,799 B2
(45) Date of Patent: Dec. 20, 2005

(54) MAGNETIC HEAD COMPRISING A MULTILAYER MAGNETORESISTIVE DEVICE AND A YOKE FOR INTRODUCING MAGNETIC FLUX FROM A MEDIUM TO THE MAGNETORESISTIVE DEVICE

(75) Inventors: Masayoshi Hiramoto, Ikoma (JP); Nozomu Matsukawa, Nara (JP); Akihiro Odagawa, Nara (JP); Kenji Iijima, Kyoto (JP); Hiroshi Sakakima, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 57 days.

(21) Appl. No.: 10/896,774

(22) Filed: Jul. 22, 2004

(65) Prior Publication Data

US 2004/0257712 A1 Dec. 23, 2004

Related U.S. Application Data

(62) Division of application No. 09/829,400, filed on Apr. 9, 2001, now Pat. No. 6,785,100.

(30) Foreign Application Priority Data

Apr. 10, 2000 (JP) ........................................ 2000-107580

(51) Int. Cl.[7] .............................................. G11B 5/39
(52) U.S. Cl. ................... 360/321; 360/324.12
(58) Field of Search ............................ 360/321, 324.12, 360/324.2, 324.1, 322

(56) References Cited

U.S. PATENT DOCUMENTS

| | | | |
|---|---|---|---|
| 5,898,547 A | 4/1999 | Fontana, Jr. et al. | 360/324.2 |
| 5,909,344 A | 6/1999 | Gill | 360/321 |
| 5,930,087 A | 7/1999 | Brug et al. | 360/324.2 |
| 6,046,891 A | 4/2000 | Yoda et al. | 360/324.1 |
| 6,064,552 A | 5/2000 | Iwasaki et al. | 360/322 |
| 6,134,078 A | 10/2000 | Suzuki | 360/315 |
| 6,239,955 B1 | 5/2001 | Dovek et al. | 360/321 |
| 6,307,708 B1 | 10/2001 | Yoda et al. | 313/310 |
| 6,369,992 B1 | 4/2002 | Yoda et al. | 360/321 |
| 6,519,124 B1 | 2/2003 | Redon et al. | 360/324.2 |
| 6,542,343 B1 | 4/2003 | Gill | 360/324.2 |
| 6,678,126 B2 * | 1/2004 | Katakura et al. | 360/321 |
| 6,804,089 B2 * | 10/2004 | Funayama et al. | 360/321 |
| 2002/0141118 A1 * | 10/2002 | Nemoto | 360/319 |
| 2003/0137780 A1 * | 7/2003 | Fontana et al. | 360/324.2 |

FOREIGN PATENT DOCUMENTS

| | | |
|---|---|---|
| JP | 62-172515 | 7/1987 |
| JP | 11-25425 | 1/1999 |
| JP | 11-213349 | 8/1999 |
| JP | 2002-222505 | 8/2002 |

* cited by examiner

Primary Examiner—Jefferson Evans
(74) Attorney, Agent, or Firm—Hamre, Schumann, Mueller & Larson, P.C.

(57) ABSTRACT

The present invention provides a magnetic head having improved characteristics, using a magnetoresistive device in which current flows across the film plane such as a TMR device. In a first magnetic head of the present invention, when the area of a non-magnetic layer is defined as a device cross-section area, and the area of a yoke is defined as a yoke area, viewed along the direction perpendicular to the surface of the substrate over which the yoke and the magnetoresistive device are formed, then the device cross-section area is not less than 30% of the yoke area, so that a resistance increase of the device cross-section area is suppressed. In a second magnetic head of the present invention, a magnetoresistive device is formed on a substrate, and a yoke is provided above a non-magnetic layer constituting the device. In a third magnetic head of the present invention, the free layer of the magnetoresistive device includes at least two magnetic films and at least one non-magnetic film that are laminated alternately, and the thickness of the non-magnetic layer is not less than 2 nm and not more than 10 nm, and magnetostatic coupling is dominant. In a fourth magnetic head of the present invention, a magnetic gap is provided adjacent to the magnetoresistive device and the magnetic films are coupled antiferromagnetically.

7 Claims, 20 Drawing Sheets

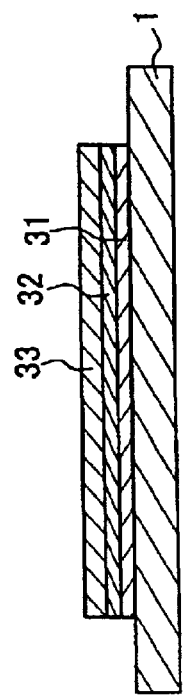
FIG. 11A
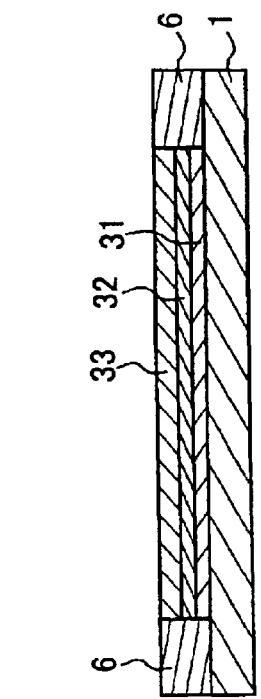
FIG. 11B
FIG. 11C
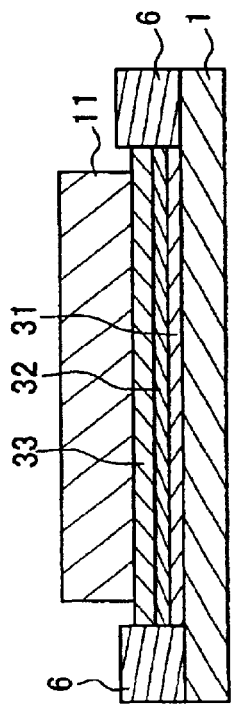
FIG. 11D
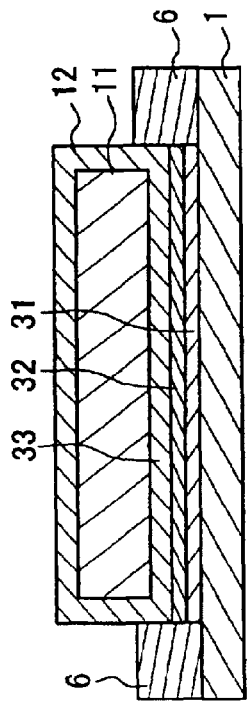
FIG. 11E
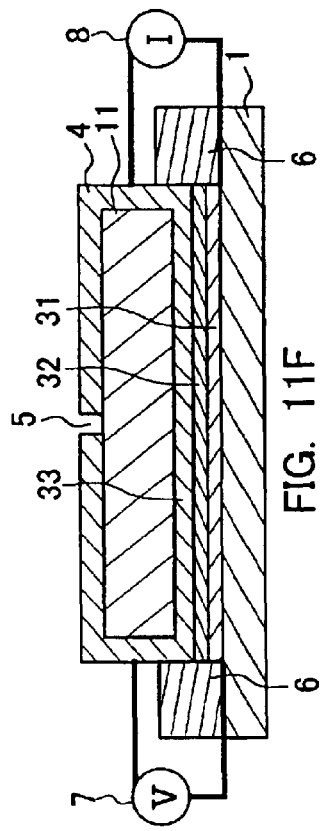
FIG. 11F

MAGNETIC HEAD COMPRISING A MULTILAYER MAGNETORESISTIVE DEVICE AND A YOKE FOR INTRODUCING MAGNETIC FLUX FROM A MEDIUM TO THE MAGNETORESISTIVE DEVICE

This application is a divisional of application Ser. No. 09/829,400, filed Apr. 9, 2001, now U.S. Pat. No. 6,785,100 which application is incorporated herein by reference.

TECHNICAL FIELD

The present invention relates to magnetic heads useful as reading heads for magnetic media such as magnetic disks, magneto-optical disks and magnetic tapes. In particular, the present invention relates to magnetic heads using magnetoresistive devices in which current flows perpendicularly to the film plane via a non-magnetic layer, such as a magnetoresistive device using a tunneling magnetoresistive effect (TMR device) and a magnetoresistive device using a giant magnetoresistive effect of the current perpendicular to the plane type (CPPGMR device).

BACKGROUND ART

In order to deal with increasing magnetic recording densities, spin-valve type GMR devices are beginning to be put into use. The principle of the spin-valve type GMR devices is explained based on changes in the mean free path of electrons traveling in the direction along the film plane (inplane direction), depending on the angle formed by the magnetization directions of the free layer and the pinned (fixed) layer. The spin-valve type GMR device has achieved a MR ratio (magnetoresistance ratio) of about 10%, which is several times higher than that of conventional anisotropic MR devices.

On the other hand, TMR devices are under development as a material that can provide even higher MR ratios. TMRs utilize the tunnel transition probability that varies with the angle formed by the magnetization directions of two ferromagnetic layers via a non-magnetic tunnel layer. In the TMR devices, unlike the spin-valve type GMRs, current flows in the direction across the film plane (direction perpendicular to the plane).

The following structures of magnetic heads using the TMR devices have been proposed. JP11-213349A discloses a magnetic head having a structure in which a MR device portion of a shield type MR head used in conventional GMR heads is replaced by a TMR device, and a flux guide is provided. JP11-25425A discloses a magnetic head having a structure where a yoke is provided such that the yoke plane is perpendicular to the surface of the substrate, and a TMR device is provided in the yoke. In this magnetic head, the yoke is formed on the substrate, and the magnetoresistive device is provided on a part of the yoke.

DISCLOSURE OF INVENTION

It is an object of the present invention to provide a magnetic head having a structure suitable for a magnetoresistive device (magnetoresistive effect device) in which current flows perpendicularly to the film plane, such as a TMR device. It is another object of the present invention to provide a magnetic head having improved characteristics that can be achieved by improving the magnetoresistive device in which current flows perpendicularly to the film plane.

A magnetic head of the present invention includes a magnetoresistive device in which current flows in a direction perpendicular to a film plane. Basically, the magnetic head of the present invention includes a magnetoresistive device including a laminate structure in which a non-magnetic layer is interposed between a first magnetic layer and a second magnetic layer; a yoke for introducing an external magnetic field from a magnetic gap to the magnetoresistive device; a current introducing part for allowing current to flow between the first magnetic layer and the second magnetic layer via the non-magnetic layer; a measuring part for detecting a change in resistance occurring between the first magnetic layer and the second magnetic layer in accordance with a relative magnetization angle between the first magnetic layer and the second magnetic layer that is changed by the external magnetic field induced via the yoke; and a substrate over which the magnetoresistive device and the yoke are formed.

A first magnetic head of the present invention is characterized in that when the area of the non-magnetic layer is defined as a device cross-section area and the area of the yoke is defined as a yoke area, viewed along a direction perpendicular to a surface of the substrate, then the device cross-section area is not less than 30%, preferably not less than 50% of the yoke area.

In the magnetoresistive device in which current flows in a direction perpendicular to a film plane, unlike a device in which current flows along an inplane direction, an increase of the device resistance involved in achieving compactness of the device may deteriorate the characteristics of the head easily. In the first magnetic head, the increase of the device resistance is suppressed by making the ratio of the device cross-section area to the yoke area larger than that of conventional magnetic heads. When the device cross-section area is restricted to be as small as not more than $0.1\,\mu m^2$, the large ratio provides a large effect, although there is no particular limitation regarding the device cross-section area.

Furthermore, the first magnetic head of the present invention can achieve a short magnetic path length by which slight magnetic flux leaked from an ideal bit can be introduced to the yoke sufficiently. In order to introduce the magnetic flux sufficiently, it is preferable that the yoke height is not more than $10\,\mu m$. Furthermore, in the first magnetic head, the ratio of the device cross-section area to the yoke area is large, and therefore the shape anisotropic effect of the yoke that causes the magnetic domains to block each other can be reduced, so that stable outputs can be obtained.

A second magnetic head of the present invention is characterized in that the magnetoresistive device is formed on the substrate, and the yoke is provided above the non-magnetic layer constituting the magnetoresistive device.

Conventionally, the yoke is formed on the substrate, and the magnetoresistive device is formed on the yoke (see JP 11-25425A). However, in the second magnetic head, the magnetoresistive device is provided between the substrate and the yoke, so that a region in which the device is to be formed can be obtained without being limited by the shape of the yoke and the increase of the device resistance can be suppressed. The second magnetic head is particularly suitable for a magnetic head having a form in which the yoke plane is substantially perpendicular to the surface of the substrate.

In the specification of the present invention, "substantially perpendicular" refers to an angle in the range of $90°\pm20°$, and "substantially parallel" refers to an angle in the range of $0°\pm20°$. Furthermore, "approximately perpendicular" refers to an angle in the range of $90°\pm30°$.

A third magnetic head of the present invention is characterized in that a magnetic layer that is either one selected from the first magnetic layer and the second magnetic layer and in which magnetization rotation is caused more easily by external magnetization than in the other magnetic layer (so-called free layer; the other layer is a pinned layer) comprises at least two magnetic films and at least one non-magnetic film that are laminated alternately, and the thickness of the non-magnetic film is not less than 2 nm and not more than 10 nm.

If the thickness of the non-magnetic film is in the above-described range, magnetostatic coupling is dominant between the pair of magnetic films that are laminated via this layer. Therefore, in the third magnetic head, the magnetic domains are stabilized, so that in the free layer, magnetization rotation is caused even more easily by an external magnetic field. Thus, the head characteristics are improved.

A fourth magnetic head of the present invention is characterized in that at least one magnetic gap is formed between a part of the yoke provided so as to constitute at least a part of one magnetic layer selected from the first magnetic layer and the second magnetic layer and the remaining part of the yoke, and the one layer is a magnetic layer (free layer) in which magnetization rotation is caused more easily by external magnetization than in the other magnetic layer. Furthermore, the free layer comprises at least two magnetic films and at least one non-magnetic film that are laminated alternately, the pair of adjacent magnetic films are coupled antiferromagnetically via the non-magnetic film, and the magnetic moment is not closed in the at least two magnetic films.

When a part of the yoke also functions as the magnetoresistive device, and a magnetic gap is formed between the magnetoresistive device and the remaining part of the yoke, the shape anisotropic effect of the yoke can be reduced. However, at the same time, the formation of the magnetic gap increases the demagnetizing field and reduces the magnetic flux induced to the device, because the magnetoresistive device is separated from the yoke. Therefore, in the fourth magnetic head, at least two magnetic films are coupled antiferromagnetically so that the effective magnetic moment is reduced. However, when the magnetic moments are completely canceled (namely, the magnetic moment is closed between the magnetic films), the magnetization rotation in the free layer hardly is generated. Therefore, the magnetic films preferably are coupled antiferromagnetically to each other to an extent that allows the magnetic moment to leak to the outside. The thickness of the non-magnetic film suitable for antiferromagnetic coupling is smaller than that suitable for magnetostatic coupling, and preferably is not less than 0.2 nm and not more than 1.0 nm.

BRIEF DESCRIPTION OF DRAWINGS

FIGS. 11A to 11F are views showing an example of the production process of the magnetic heads shown in FIGS. 9 and 10.

DETAILED DESCRIPTION OF THE INVENTION

Hereinafter, preferable embodiments of the present invention will be described.

Figure 1:
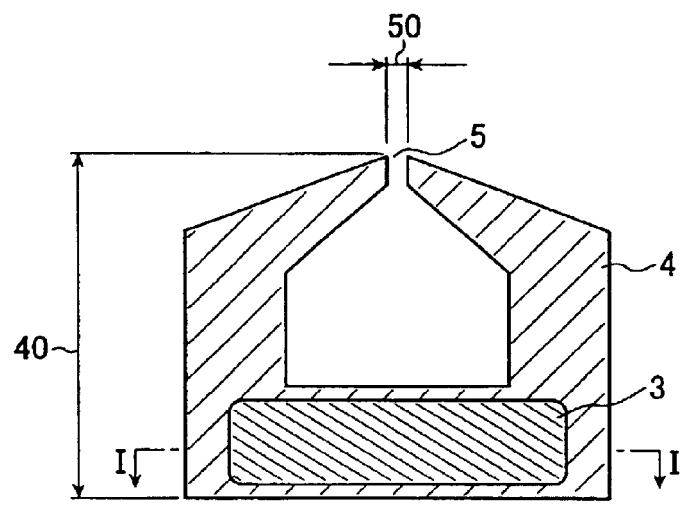
FIG. 1 is a plan view showing an arrangement of a yoke and a magnetoresistive device in an embodiment of a magnetic head of the present invention.
Figure 2:
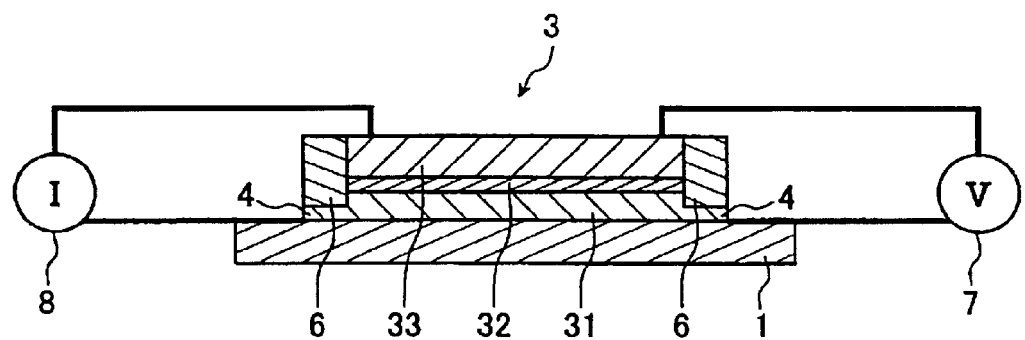
FIG. 2 is a cross-sectional view of the magnetic head taken along line I—I of FIG. 1.

A magnetic head shown in FIGS. 1 and 2 uses a TMR device 3 including a first magnetic layer 31, a non-magnetic layer 32 and a second magnetic layer 33 that are laminated on a substrate 1 in this order. An external magnetic field is introduced to the TMR device 3 via a yoke 4 from a magnetic gap 5, and the relative magnetization angle of the magnetic layers 31 and 33 of the magnetoresistive device is changed by this magnetic field. With the changes of this relative magnetization angle, the tunnel transition probability between the two magnetic layers changes. The changes of the tunnel transition probability can be measured, for example as a voltage change when current is supplied from a constant current supply 8, using a voltage meter 7.

When the TMR device 3 is too small, the device resistance is too high, and therefore this magnetic head is designed so that the area of the TMR device is not less than 30%, preferably not less than 50%, of the area of the yoke. More specifically, it can be said that the area of the TMR device is the area of the non-magnetic layer 32 in which current flows, and the area of the yoke is the area obtained by integrating the width of the magnetic flux path along the magnetic flux path. In this magnetic head, a part of the yoke 4 constitutes the first magnetic layer 31 of the magnetoresistive device, so that the area of the yoke includes a hatched region 4 in FIG. 1 and a hatched region 3 that is hatched to indicate that this is the area of the magnetoresistive device as well. As shown in FIG. 2, the thickness of the yoke 4 (thickness of a layer sandwiched between the substrate 1 and an interlayer insulating film 6) is not necessarily equal to the thickness of the magnetic layer 31.

In order to induce a sufficient external magnetic field to the magnetoresistive device 3, the length 40 of a side of the yoke, which is generally called yoke height, preferably is not more than 10 $\mu$m, more preferably not more than 3 $\mu$m. It can be said that the yoke height is the length corresponding to the depth of the yoke when viewed from the magnetic gap 5.

In FIG. 1, the plane indicated by the hatched region 4 may be referred to as a yoke plane. In the magnetic head shown in FIGS. 1 and 2, the yoke plane is substantially parallel to the surface of the substrate. It can be said that the yoke plane is a plane parallel to a plane in which the path (magnetic flux path) through which the magnetic flux induced from the magnetic gap 5 passes forms a loop.

The width 50 of the magnetic gap preferably is not more than 200 nm, although it depends on the recorded bit length, and preferably not less than 10 nm, although there is no particular limitation. However, when the device size is small, the range of from 10 to 90 nm is preferable.

Figure 3:
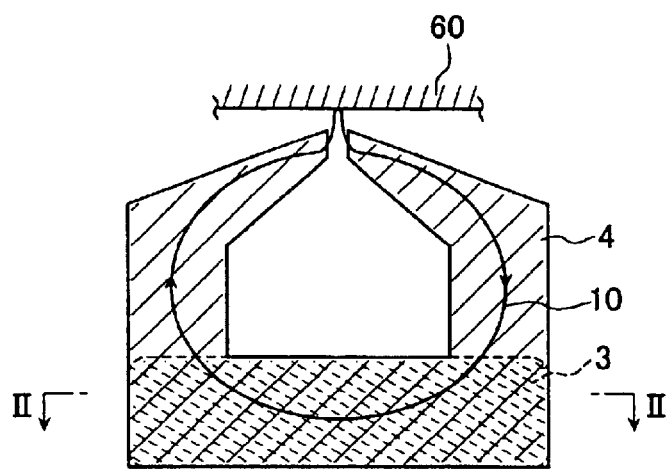
FIG. 3 is a plan view showing an arrangement of a yoke and a magnetoresistive device in another embodiment of a magnetic head of the present invention.
Figure 4:
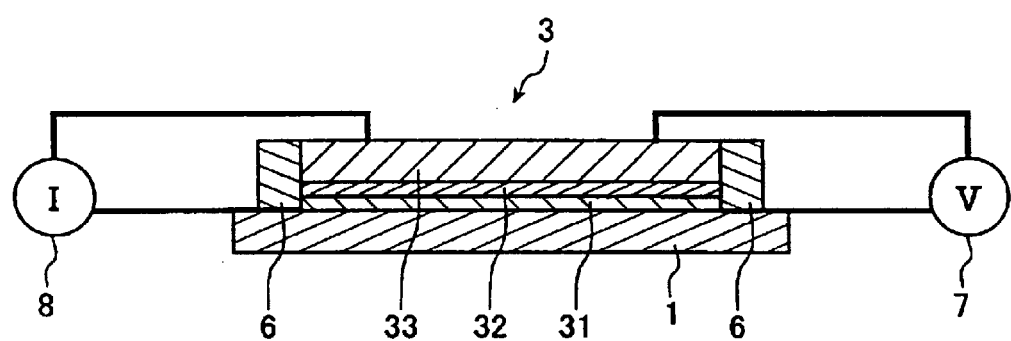
FIG. 4 is a cross-sectional view of the magnetic head taken along line II—II of FIG. 3.

The magnetic head shown in FIGS. 3 and 4 basically has the same structure of the magnetic head shown in FIGS. 1 and 2, but is different in that the magnetoresistive device 3 is formed on the substrate 1 and the yoke 4 is disposed on this device. In this head, a part of the yoke 4 constitutes the second magnetic layer 33 of the magnetoresistive device. In view of this point, more specifically, the yoke 4 is disposed on the non-magnetic layer 32 constituting the magnetoresistive device 3.

When the magnetoresistive device is provided on the near side of the substrate surface as in this example, a so-called pinned layer made of an antiferromagnetic film or a high coercive film can be formed close to the substrate surface. Therefore, reduction of the uniaxial anisotropic magnetic field of the pinned layer due to an increase of roughness of an underlying layer can be suppressed. Furthermore, this is advantageous in that a region where the device is to be formed can be obtained without being limited by the yoke shape.

A magnetic flux path 10 formed by the external magnetic field introduced from the magnetic gap 5 to the magnetoresistive device 3 is observed as a loop passing through the yoke 4 and a medium 60 (more specifically, a magnetic pole in the medium) when observed from the direction perpendicular to the yoke plane. This loop formed by the magnetic flux may be referred to as a magnetic circuit in the following description.

Figure 5:
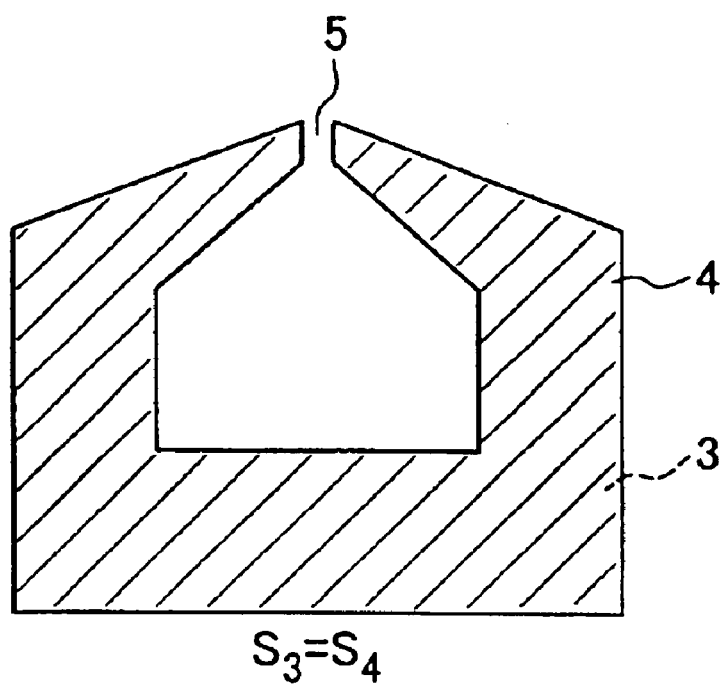
FIG. 5 is a plan view showing an arrangement of a yoke and a magnetoresistive device in yet another embodiment of a magnetic head of the present invention.

The upper limit of the ratio of the device cross-section area to the yoke area is not limited to a particular value. However, in order to obtain a sufficient magnetization rotation angle of the device from a small magnetic field from the medium, the ratio preferably is not more than 300%. An example of the form having a preferable ratio is the head as shown in FIG. 5 that is obtained by expanding the device cross-section area in the magnetic head of FIG. 3 up to the area equal to the yoke area (the ratio is 100%; $S_3=S_4$). However, the form of the magnetic head of the present invention is not limited thereto, and as in the magnetic head shown in FIGS. 6 and 7, the yoke area may be made large by forming the second magnetic layer 33 so as to be projected to be on the interlayer insulating layer 6.

Figure 8:
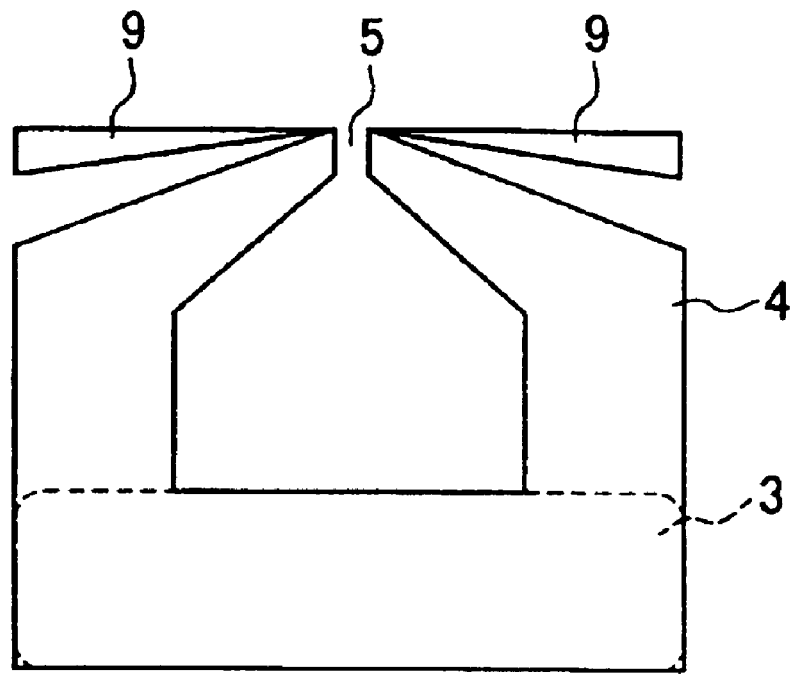
FIG. 8 is a plan view showing an arrangement of a yoke and a magnetoresistive device in another embodiment of a magnetic head of the present invention.

As shown in FIG. 8, when a magnetic material is provided close to the magnetic gap 5 as a magnetic shield 9, the head characteristics are improved further. This magnetic shield 9 is provided on the face of the yoke 4 opposed to a recording medium and adjacent to the magnetic gap 5 (the recording medium is not shown) so that the leakage magnetic field from neighboring recorded bits can be shielded.

Figure 9:
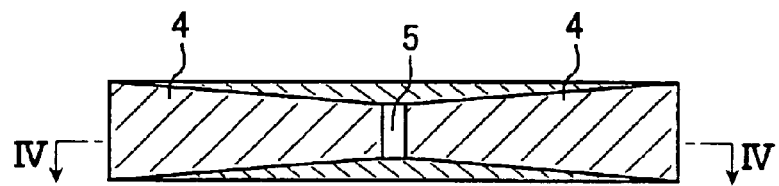
FIG. 9 is a plan view showing an arrangement of a yoke and a magnetoresistive device in yet another embodiment of a magnetic head of the present invention.
Figure 10:
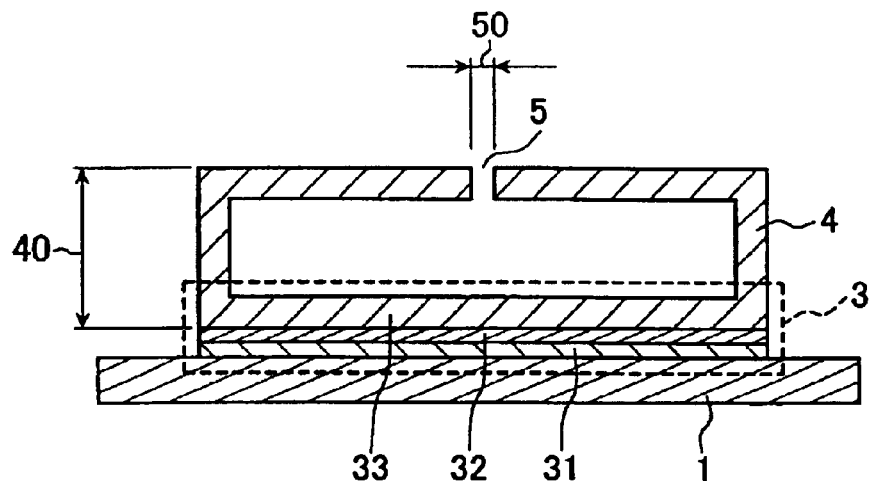
FIG. 10 is a cross-sectional view of the magnetic head taken along line IV—IV of FIG. 9.

In a magnetic head as shown in FIGS. 9 and 10, the yoke plane is substantially perpendicular to the surface of the substrate. In the magnetic head in this form, the magnetoresistive device 3 can be disposed on the yoke 4 as in those shown in FIGS. 1 to 4, but in order to obtain the device cross-section area, it is far more advantageous that the yoke 4 is disposed on the magnetoresistive device 3. In this magnetic head as well, it is preferable that the yoke height 40 is not more than 10 $\mu$m, and the magnetic gap width is not more than 200 nm in order to obtain good reading characteristics with respect to a small magnetic field.

Furthermore, as shown in FIG. 9, when the yoke 4 is formed so as to be made narrower toward the magnetic gap 5, it is possible to narrow tracks, which is necessary for achieving high recording density, and the magnetic flux from neighboring tracks hardly can be picked up.

Figure 12:
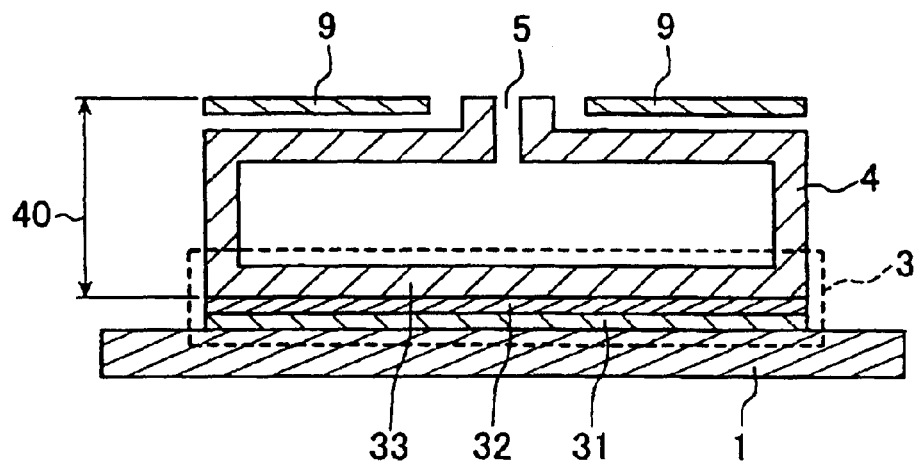
FIG. 12 is a cross-sectional view showing another example of a magnetic head of the present invention.
Figure 13:
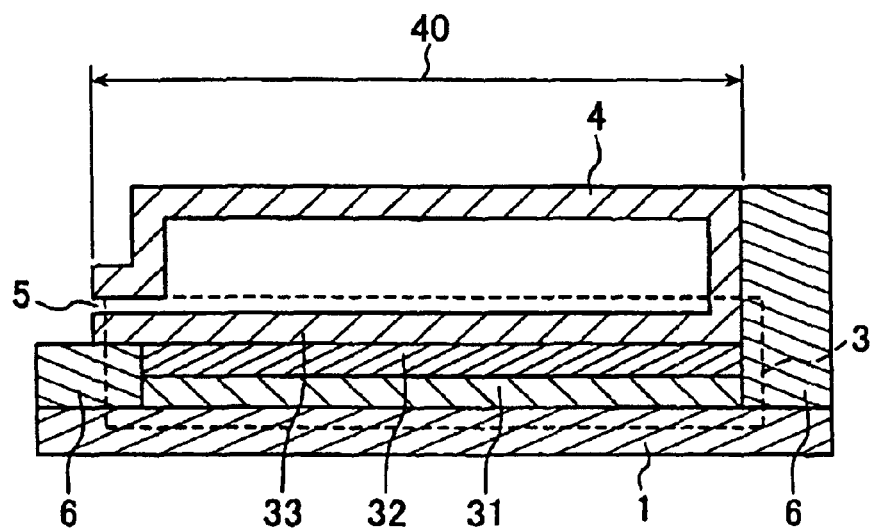
FIG. 13 is a cross-sectional view showing yet another example of a magnetic head of the present invention.
Figure 14:
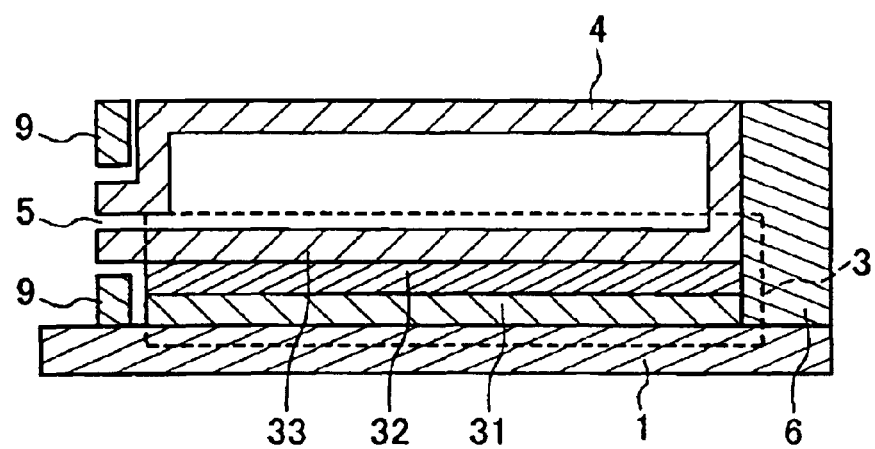
FIG. 14 is a cross-sectional view showing still another example of a magnetic head of the present invention.

In the magnetic head in this form, the magnetic shield 9 is provided in the manner shown in FIGS. 12 and 14, and the leakage magnetic field from the neighboring recorded bit to be read can be shielded. Therefore, the reading characteristics of magnetic information recorded with a high density can be improved. Furthermore, in the magnetic heads shown in FIGS. 10 and 12, the planes of the yoke that are opposed to each other via the magnetic gap (gap planes) are substantially perpendicular to the substrate. However, as shown in FIGS. 13 and 14, the gap planes can be substantially parallel to the substrate.

The magnetoresistive device has at least one structure in which a non-magnetic layer is interposed between a pair of magnetic layers. When one magnetic layer of the pair of magnetic layers is defined as a free layer and the other is defined as a pinned layer, depending on the easiness of rotating the magnetization direction, the free layer can be a single layer, but preferably is a laminate of at least two magnetic films laminated via a non-magnetic film having a thickness of 2 to 10 nm. This is preferable because the magnetic domains are stabilized even if the device size is made small by the magnetostatic coupling of the neighboring magnetic films, so that the reading characteristics of magnetic information can be stabilized. Furthermore, magnetization rotation occurs more easily with respect to a small magnetic field in the free layer because the magnetostatic coupling is dominant. It is particularly preferable that the magnetization directions of the pair of adjacent magnetic films via the non-magnetic film are substantially parallel or substantially antiparallel to each other in no magnetic field.

The pinned layer can be a multilayered film where a non-magnetic film is inserted in magnetic films and the non-magnetic film has a thickness in the range allowing not magnetostatic coupling but exchange coupling to be dominant. Alternatively, antiferromagnetic films made of elements selected from Groups 6A to 8 such as FeMn, PtMn, PtRhMn, PtPdMn, IrMn and NiMn can be adjacent.

Figure 15:
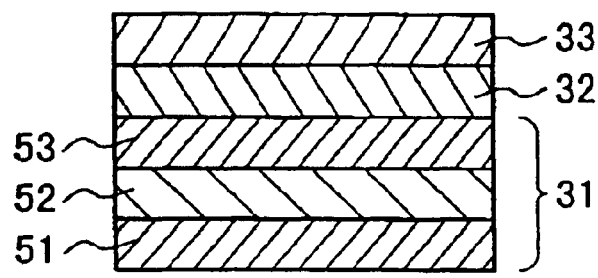
FIG. 15 is a cross-sectional view showing an example of the film structure of a magnetoresistive device.
Figure 16:
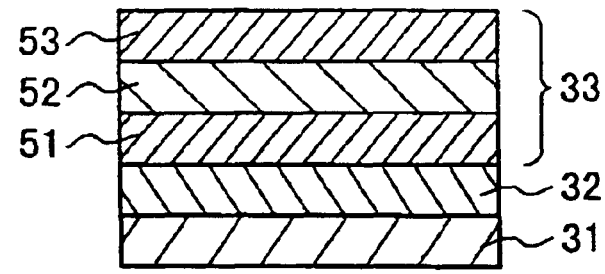
FIG. 16 is a cross-sectional view showing another example of the film structure of a magnetoresistive device.

As shown in FIGS. 15 and 16, the multilayered film as the free layer may be either one of the first magnetic layer 31 and the second magnetic film 33 that are opposed via the non-magnetic layer 32. In the examples shown in FIGS. 15 and 16, the multilayered film as the free layer has a three layer structure including magnetic layers 51 and 53 and a non-magnetic layer 52. However, the free layer can include more films.

Furthermore, using a non-magnetic film 32 made of an insulator or a semiconductor, tunnel current or conduction of hot electrons occurs, so that the device resistance becomes comparatively high, and control of the resistance of the magnetic head can be facilitated.

In the magnetic head in which a part of at least a part of the free layer shown in FIGS. 15 and 16 is used as a part of the yoke, the linear characteristics of the magnetoresistive device can be improved. In the case where the yoke is a single layered magnetic material and is not provided with a magnetic anisotropy, the yoke has a closed magnetic flux, and therefore the direction of the axis of easy magnetization corresponds to the direction of the circumference of the yoke (extension direction of the magnetic flux path) because of the demagnetizing field. Therefore, the yoke itself has a hysteresis with respect to a change in the magnetic flux introduced from the outside, so that the linear characteristics of the magnetoresistive device are deteriorated. On the other hand, when the above-described film structure shown as the free layer is used for the yoke, the magnetic poles are coupled magnetostatically on the side of the minor axis of the yoke, and therefore the magnetization direction of the yoke is approximately perpendicular to the direction of the circumference of the yoke. Furthermore, the magnetostatic coupling between the magnetic layers can reduce the influence of the leakage magnetic field on the pinned layer. Thus, the reading characteristics such as high linearity can be obtained.

Figure 17:
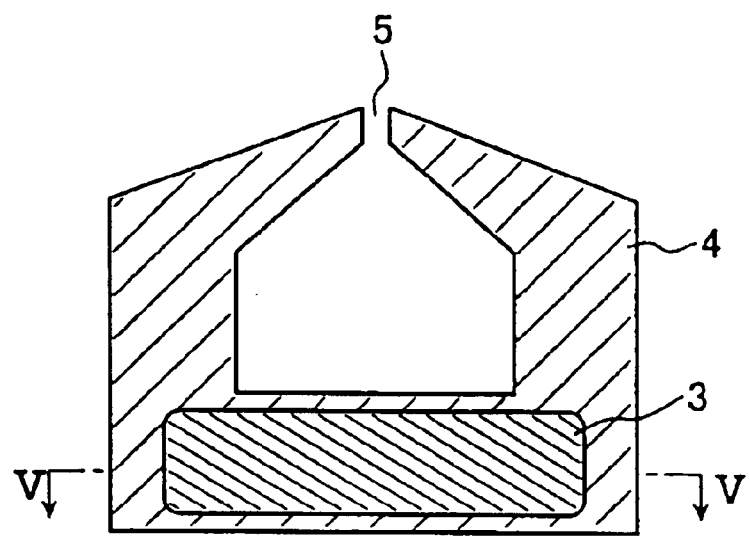
FIG. 17 is a plan view showing an arrangement of a yoke and a magnetoresistive device in an embodiment of a magnetic head of the present invention using the magnetoresistive device shown in FIG. 15.
Figure 18:
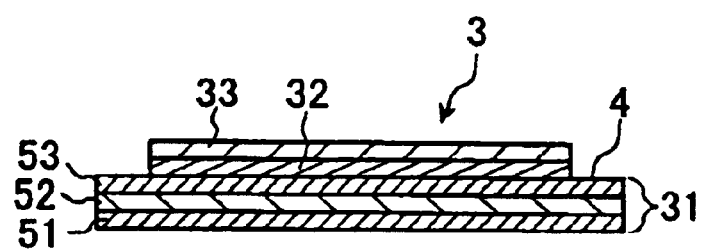
FIG. 18 is a cross-sectional view of the magnetic head taken along line V—V of FIG. 17.

It is advantageous that the free layer is used only as a part of the yoke, but as shown in FIGS. 17 and 18, if the entire yoke 4 is constituted with a magnetic layer including the magnetic films 51 and 53 that are coupled magnetostatically via the non-magnetic film 52, the linearity of the reading characteristics of the magnetic head can be significantly improved.

In the magnetic heads of the present invention, which is not limited to the magnetic head in this form, when the magnetization direction of the magnetic material constituting the yoke is approximately perpendicular to the extension direction of the magnetic flux path generated in the yoke by the external magnetization introduced to the yoke, the reading characteristics for magnetic information are improved. It is preferable that in such a head, anisotropy that is approximately perpendicular to the magnetic flux path direction of the yoke is provided to the magnetic material constituting the yoke by first providing the pinned layer with uniaxial anisotropy at a high temperature and a high magnetic field, and then treating at a lower temperature and a lower magnetic field than above while applying a magnetic field, for example, to the direction orthogonal to the previous treatment.

Another embodiment of the magnetic head of the present invention will be described with reference to FIGS. 19 to 24.

Figure 22:
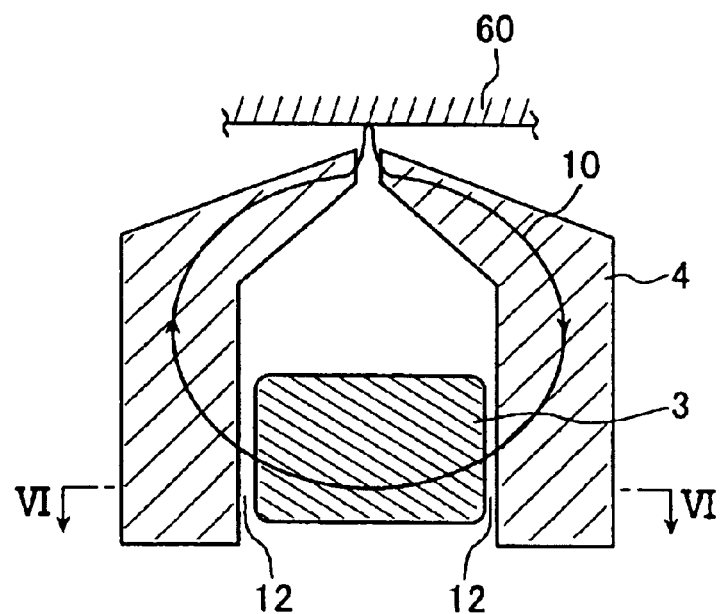
FIG. 22 is a plan view showing an arrangement of a yoke and a magnetoresistive device in an embodiment of a magnetic head of the present invention using the magnetoresistive device shown in FIG. 19.
Figure 23:
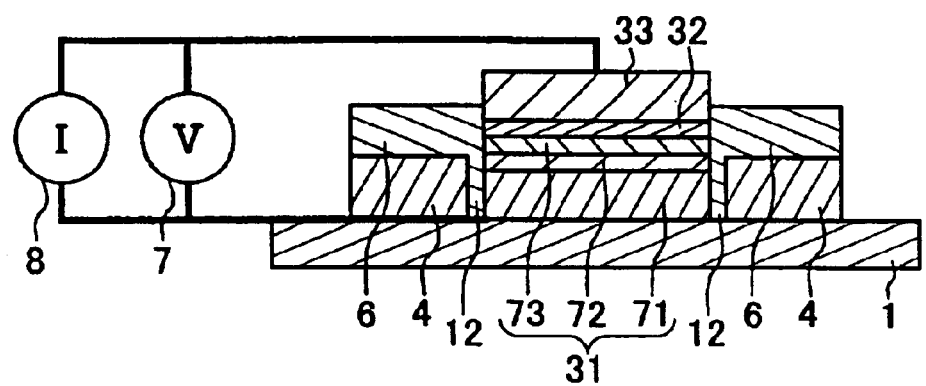
FIG. 23 is a cross-sectional view of the magnetic head taken along line VI—VI of FIG. 22.
Figure 24:
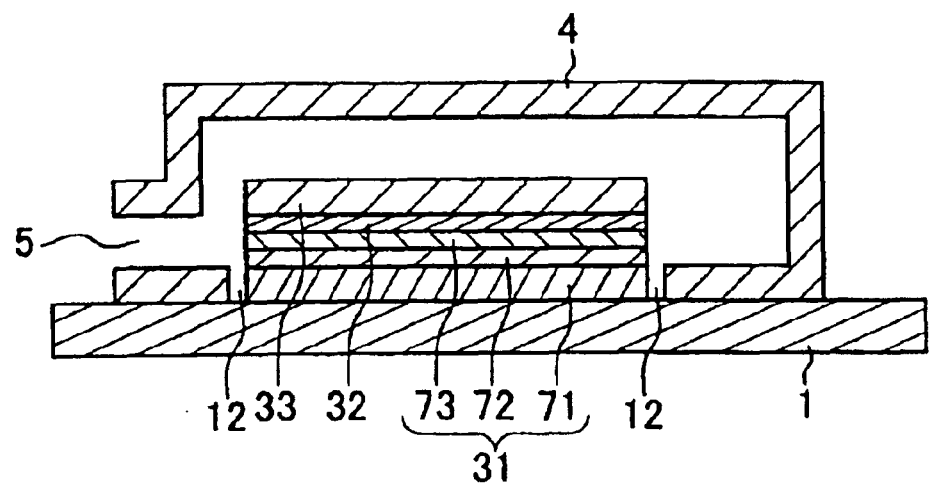
FIG. 24 is a plan view showing another embodiment of a magnetic head of the present invention using the magnetoresistive device shown in FIG. 19.

As shown in FIGS. 22 and 23, also in this magnetic head, a part of the yoke constituting the magnetic flux path 10 constitutes the first magnetic layer 31, which is the free layer. However, in this magnetic head, the first magnetic layer 31 is separated from the yoke (the remaining yoke excluding the portion constituting the free layer) 4 by the magnetic gap 12, so that the exchange coupling between the magnetoresistive device 3 and the yoke 4 is interrupted. For this reason, the magnetization rotation in the magnetoresistive device is hardly susceptible to the influence of the shape anisotropy of the yoke, so that the degree of freedom of device design is improved.

The width of the magnetic gap 12 preferably is not less than 10 nm and not more than 200 nm.

However, when the additional magnetic gap 12 is provided, the amount of the magnetic flux induced to the magnetoresistive device is reduced and the demagnetizing field is increased. In order to cause magnetization rotation in the free layer with a small amount of magnetic flux, and suppress the demagnetizing field, it may be preferable to reduce the thickness of the free layer, but physically the film thickness has a limitation. Furthermore, when the thickness is reduced, constraint occurs on the design such as achieving both high spin polarizability and low coercivity.

Figure 19:
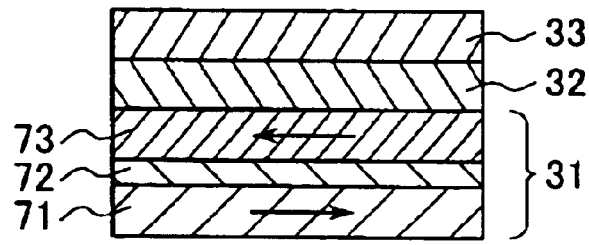
FIG. 19 is a cross-sectional view showing an example of the film structure of a magnetoresistive device including antiferromagnetic coupling.
Figure 20:
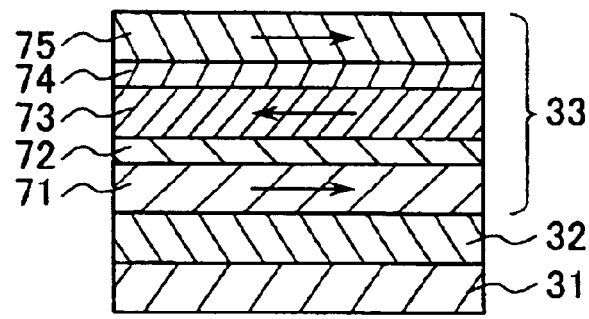
FIG. 20 is a cross-sectional view showing another example of the file structure of a magnetoresistive device including antiferromagnetic coupling.

Therefore, in this free layer 31, utilizing antiferromagnetic coupling, the effective magnetic moment is reduced. For example, when the free layer 31 including a first magnetic film 71, a non-magnetic film for antiferromagnetic coupling 72, and a second magnetic film 73 that are laminated in this order, as shown in FIG. 19, is used, the magnetic moments are canceled between the two magnetic films, so that magnetization rotation is caused easily with respect to a small external magnetic field, and the demagnetizing field is suppressed. It is possible to increase the number of the magnetic films. For example, a free layer 33 having the structure shown in FIG. 20 can be used, in which a first magnetic film 71, a second magnetic film 73, and a third magnetic film 75 are laminated via non-magnetic films 72 and 74 for antiferromagnetic coupling.

The thickness of the non-magnetic films for antiferromagnetic coupling preferably is 0.2 to 1.0 nm. When the thickness is less than 0.2 nm, the ferromagnetic exchange coupling is dominant. When the thickness is more than 1.0 nm, the antiferromagnetic coupling becomes weak. The thickness of the magnetic films coupled antiferromagnetically via the non-magnetic films preferably is 1 nm to 6 nm. When the thickness of the magnetic film is too large, the magnetic moments may not be sufficiently canceled.

Figure 21:
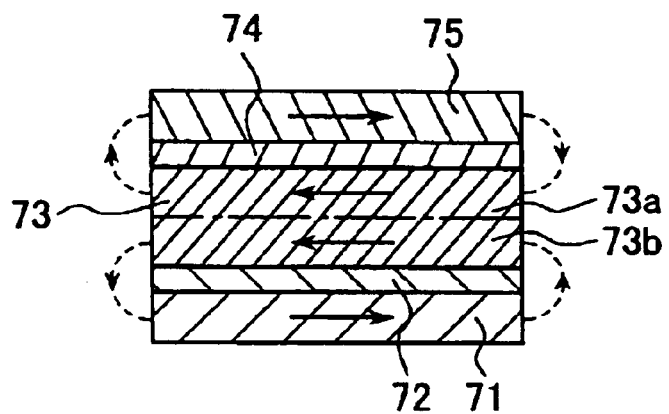
FIG. 21 is a cross-sectional view showing an example of the film structure of a magnetoresistive device in which the magnetic moment is closed.

However, when the magnetic moments between the magnetic films 71, 73, and 75 are completely canceled, as shown in FIG. 21 (in FIG. 21 the magnetic moments are canceled between the magnetic film 71 and the magnetic film 73a, and between the magnetic film 75 and the magnetic film 73b), no magnetization rotation is generated by an external magnetic field. Therefore, it is necessary to cancel the magnetic moment by antiferromagnetic coupling to an extent that allows the magnetic moment to leak from the free layer.

In the state where the magnetic moment is closed, the following equation (1) is satisfied between the first magnetic film and the second magnetic film that are coupled antiferromagnetically via the non-magnetic film.

$$t_1 \times m_1 = t_2 \times m_2 \qquad \text{Equation (1)}$$

where $t_1$ and $t_2$ are the thickness of the first magnetic film and the second magnetic film, respectively, and $m_1$ and $m_2$ are effective magnetization of the first magnetic film and the second magnetic film, respectively.

Similarly, when the following equation (2) is satisfied between the odd number magnetic film and the even number magnetic film, the magnetic moment is closed.

$$\Sigma(t_{od} \times m_{od}) = \Sigma(t_{ev} \times m_{ev}) \qquad \text{Equation (2)}$$

where $t_{od}$ and $t_{ev}$ are the thickness of the odd number magnetic film and the even number magnetic film, respectively, and $m_{od}$ and $m_{ev}$ are effective magnetization of the odd number magnetic film and the even number magnetic film, respectively.

In order to further increase the response with respect to the external magnetic field, it is preferable to make uniform the magnetization state of the free layer with the magnetic flux induced via the magnetic gap 12. To meet this end, it is preferable to produce the state that satisfies the following equation (3) in the planes bordering on the magnetic gap 12.

$$S_1 \times M_1 < S_2 \times M_2 \qquad \text{Equation (3)}$$

where $S_1$ and $S_2$ are the effective magnetic flux path cross-section area of the part of the yoke that constitutes the free layer and the remaining part of the yoke, respectively, and $M_1$ and $M_2$ are effective magnetizations of the part of the yoke and the remaining part of the yoke, respectively. The effective magnetic flux path cross-section area refers to the cross-sectional area of the magnetic flux path obtained by taking the skin depth of the yoke in the operation frequency band into consideration, and does not refer to the physical cross-sectional area.

One preferable condition to produce the state satisfying the relationship of equation (3) is that in the planes bordering on the magnetic gap, the thickness $H_2$ of the yoke (remaining part) is larger than the thickness $H_1$ of the thickest magnetic film of the magnetic films constituting the free layer.

$$H_1 < H_2 \qquad \text{Equation (4)}$$

Figure 30:
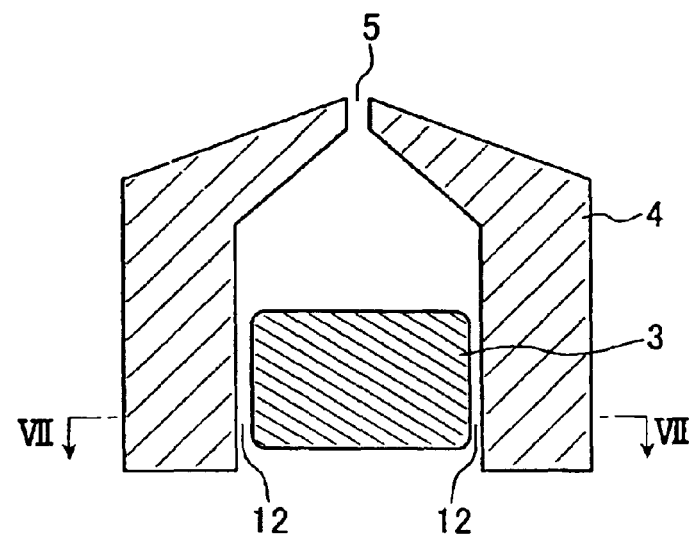
FIG. 30 is a plan view showing an arrangement of a yoke and a magnetoresistive device in another embodiment of a magnetic head of the present invention.
Figure 31:
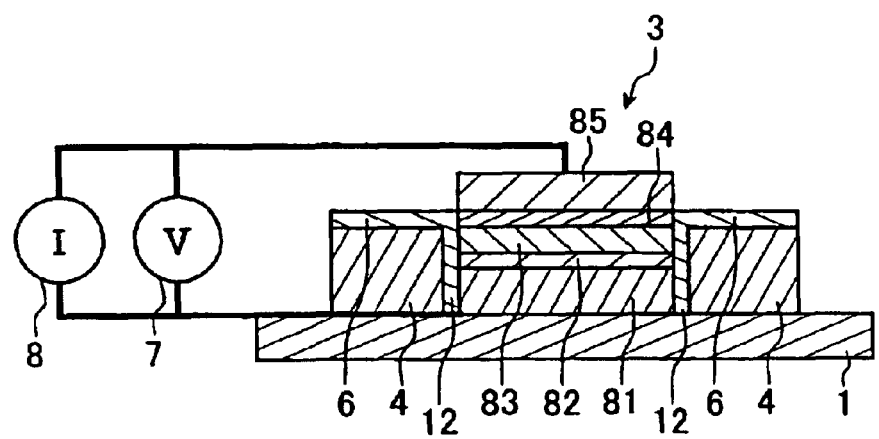
FIG. 31 is a cross-sectional view of the magnetic head taken along line VII—VII of FIG. 30.
Figure 32:
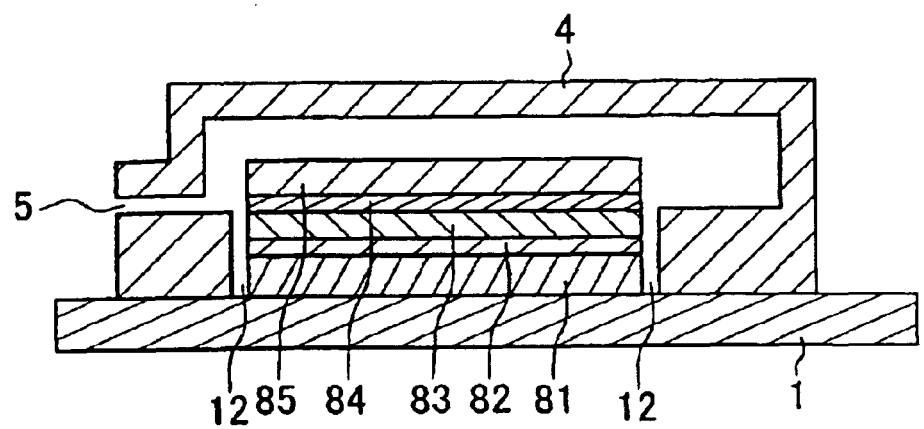
FIG. 32 is a cross-sectional view showing another example of a magnetic head of the present invention.

The additional magnetic gap can be formed in a magnetic head using a magnetoresistive device including no non-magnetic films for antiferromagnetic coupling as well as in the above example. In other words, at least one (additional) magnetic gap can be formed between a part of the yoke that is disposed so as to constitute at least a part of the magnetic films included in the magnetoresistive device and the remaining part of the yoke. FIGS. 30 to 32 show the examples of this magnetic head. In these magnetic heads, a pair of magnetic gaps 12 are formed so as to sandwich the magnetoresistive device 3, and magnetic layers 81 and 83 constitute both the device 3 and a part of the yoke 4 separated by the gap 12.

The magnetic heads shown in FIGS. 30 to 32 are examples of a head having a magnetoresistive device having at least three magnetic layers. In these magnetoresistive devices, a first magnetic layer 81, a non-magnetic layer 82, a second magnetic layer 83, a second non-magnetic layer 84, and a third magnetic layer 85 are formed in this order. When two or more non-magnetic layers are used as in this example, the bias dependence of the change rate of the magnetoresistance can be reduced. This is because scattering of electrons that have passed through tunnels due to the influence of magnon can be reduced even if used at a high bias current. The shown magnetoresistive devices can be designed so that the second magnetic layer 83 serves as the free layer and the first magnetic layer 81 and the third magnetic layer 85 serve as the pinned layers.

In all the cases of the magnetoresistive devices described above, when the free-layer is formed so as to have a shape without acute-angled or right-angled corners when observed along the direction perpendicular to the surface of the substrate, the head characteristics, especially in a high operating frequency, can be improved. There is no particular limitation regarding the shape of the plane. For example, as shown in FIGS. 27B to 27E, circles, ellipses, polygons having five or more sides and polygons such as a rectangle having rounded corners can be used. It is believed that such a shape effect is generated because the magnetic domain forming energy occurring in the free layer can be suppressed. When the free layer has the above-described shape in at least planes adjacent to the non-magnetic film, the above shape effect can be obtained.

In an apparatus for recording/reproducing magnetic information using the above-described magnetic head, it is preferable that the electrical potential of the yoke is equal to that of the recording medium. This is preferable because even if the yoke is in contact with the medium, no change in the electrical potential is caused, and reproduction outputs can be suppressed from being varied.

Figure 28A:
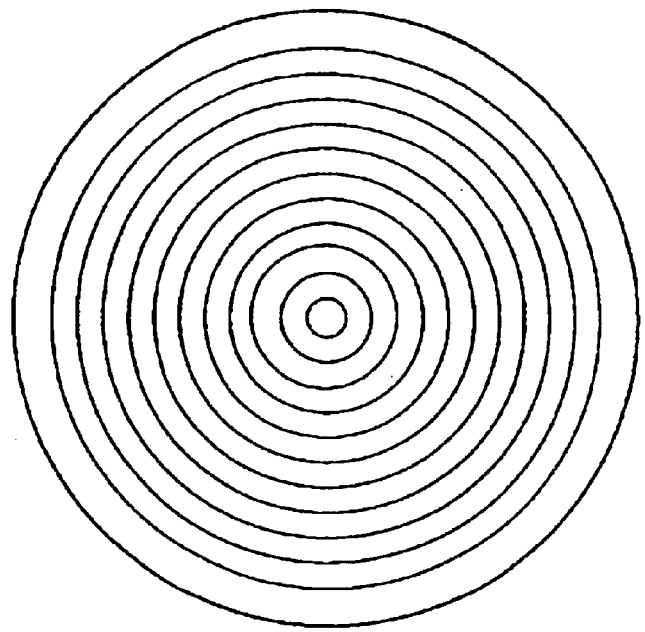
FIGS. 28A to 28B are plan views illustrating arrangements of tracks of recording media.
Figure 28B:
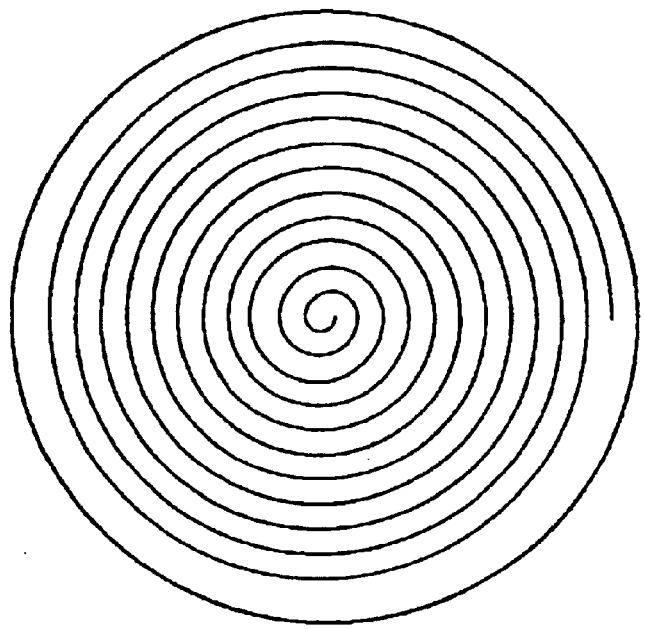

There is no particular limitation regarding the recording medium used in the apparatus for recording/reproducing magnetic information, but a medium in which tracks are formed spirally as shown in FIG. 28B is preferable. This is preferable because the seek time occurring at the time of waiting for the head to move between tracks is significantly reduced. In particular, continuous reading of dynamic images or the like can be performed at high speed.

There is no particular limitation regarding the material used for each layer included in the magnetic head of the present invention, and magnetic or non-magnetic materials that conventionally have been used can be used. As magnetic materials, Fe, Co, Ni or alloys thereof (e.g., FeCo, NiFe, NiFeCo), or compounds thereof (e.g., nitrides, oxides, carbides, borides) can be used. As the material used for the yoke, a material having a high electrical resistance that can achieve a specific resistance of 50 $\mu\Omega$cm or more, and a saturation magnetic flux density as high as more than 1T is preferable. There is no particular limitation regarding the non-magnetic material. However, it is preferable to use a non-magnetic material having a conductivity for the non-magnetic films for antiferromagnetic coupling. As a specific example of a conductor for the non-magnetic films for antiferromagnetic coupling, Cu, Ag, Au, Ru, Rh, Ir, Re, and Os, and particularly Ru and Ir are preferable. For the non-magnetic films for magnetostatic coupling, a non-magnetic metal having a high conductivity, such as Al, Cu, Pt, Pd, Rh, Cr, Mo, W, Ti, Zr, Hf, Ta, Nb, V, Mo, and W, and alloys thereof are suitable, and compounds thereof such as TiN can be used.

There is no particular limitation regarding the method for forming the layers or the like, and vacuum deposition such as IBD (ion beam deposition), sputtering, MBE, and ion-plating can be used. When forming a non-magnetic layer made of a compound, sputtering, reactive deposition, reactive sputtering, ion-assist deposition, CVD using the compound itself as a target can be used, or elements to be reacted can be left undisturbed in a reactive gas atmosphere having suitable partial pressures under suitable conditions (temperature and time).

Furthermore, for processing the magnetic head, physical or chemical etching such as ion milling, RIE, EB, FIB, I/M or the like used in a regular semiconductor process can be used. If smoothing is required in the microfabrication, a CMP method or a photolithography using the line width in accordance with the necessary microfabrication can be used. When forming films for the device, if cluster-ion beam etching is used to smooth the surface of the formed film, the MR can be improved.

EXAMPLES

Example 1

A magnetic head is produced having the same structure as that shown in FIGS. 1 and 2. In this magnetic head, a magnetoresistive device is formed on a yoke.

Using RF magnetron sputtering, Ta(3)/Cu(100)/Ta(3)/NiFe(20)/Al(0.4) were formed in this order on an AlTiC plate as a substrate. The Cu layer is a lower electrode. The NiFe layer is a first magnetic layer as a free layer. The Ta layer is an underlying layer. The values in parentheses indicate the thickness (unit nm; this applies to the following).

Then, after the Al was oxidized in an oxygen atmosphere of 200 Torr for 1 minute, an Al (0.3) film was formed thereon. Furthermore, this Al was oxidized in an oxygen atmosphere with 200 Torr for 1 minute. Thus, an Al oxide film (alumina) was formed as the non-magnetic layer.

Then, $Co_{90}Fe_{10}(3)/Ru(0.7)/Co_{90}Fe_{10}(4)/PtMn(30)/Ta(3)$ were formed into films in this order. The $Co_{90}Fe_{10}(3)/Ru(0.7)/Co_{90}Fe_{10}(4)/PtMn(30)$ was the second magnetic layer as the pinned layer.

In order to provide the films with uniaxial anisotropy, the PtMn was subjected to a heat treatment at 280° C. in a magnetic field of 5 kOe in the longitudinal direction of the device, and then was subjected to a heat treatment at 200° C. in a magnetic field of 1 kOe in the direction orthogonal to that magnetization direction. Using a photolithography technique, the films were processed to a yoke shape. In order to produce a magnetoresistive device, a resist with a rectangular shape was formed, and then NiFe under the Al oxide was milled to 10 nm using ion milling. Then, a magnetic gap was formed by FIB. The gap width was 50 nm. Then, an alumina film was formed as an interlayer insulating film and a gap insulating film (insulating film to fill the magnetic gap). After the resist was lifted off, a Cu film was formed as an upper electrode.

Regarding the magnetic head produced in the above-described process, the MR ratio (measurement voltage of 50 mV) when applying a small external magnetic field to the magnetic gap was measured with varied device cross-section areas. Table 1 shows the results.

TABLE 1

| Device cross-section area/ yoke area(%) | Device resistance(Ω) | MR ratio(%) |
| --- | --- | --- |
| 25 | 32 | 15 |
| 30 | 27 | 30 |
| 40 | 20 | 42 |

Furthermore, the MR ratio with the device cross-section area kept constant at 1 $\mu m^2$ or 0.1 $\mu m^2$ and the yoke area (yoke height) varied was measured. Tables 2 and 3 show the results.

TABLE 2

Device cross-section area = 1 $\mu m^2$

| Device cross-section area/ yoke area(%) | Device resistance(Ω) | MR ratio(%) |
| --- | --- | --- |
| 10 | 20 | 15 |
| 20 | 20 | 20 |
| 30 | 20 | 38 |
| 40 | 20 | 42 |
| 50 | 20 | 41 |

TABLE 3

Device cross-section area = 0.1 $\mu m^2$

| Device cross-section area/ yoke area(%) | Device resistance(Ω) | MR ratio (%) |
| --- | --- | --- |
| 10 | 2000 | 8 |
| 20 | 2000 | 12 |
| 30 | 2000 | 25 |
| 40 | 2000 | 23 |
| 50 | 2000 | 23 |

Since the device resistance is increased in inverse proportion to the device cross-section area, the device processing precision is substantially in the same level, and no influence of leakage or the like can be observed. It can be expected that the device resistance is increased as the device cross-section area is reduced. However, as shown in Tables 1 to 3, when the ratio of the device cross-section area to the yoke area was less than 30%, the MR ratio was reduced significantly. Since the sheet resistance of Cu as the lower electrode is sufficiently low, this reduction was not due to the shape effect.

Also in the magnetic head shown in FIGS. 3 and 4 where the yoke is formed on the magnetoresistive device, satisfactory MR ratios were obtained when the ratio of the device cross-section area to the yoke area was 30% or more. It is believed that when this ratio is maintained, the magnetic flux from the yoke can propagate sufficiently in the device.

In all the cases, as shown in Table 3, when the device cross-section area of the magnetoresistive device is as small as about 0.1 $\mu m^2$ or less and the ratio of the device cross-section area to the yoke area is less than 30%, the reduction of the MR ratio was significant. This is believed to be caused by the influence of disturbance of the domains of NiFe.

Example 2

As in Example 1, a magnetic head having the same structure as shown in FIGS. 1 and 2 was produced. In this example, the MR ratio was examined with the ratio of the device cross-section area to the yoke area kept constant at 30% or more and the yoke height varied, in the same manner as in Example 1.

TABLE 4

| Device cross-section area/ yoke area(%) | Device resistance(Ω) | MR ratio (%) |
| --- | --- | --- |
| 30 | 20 | 5 |
| 30 | 15 | 10 |
| 30 | 10 | 30 |
| 30 | 5 | 40 |
| 30 | 3 | 45 |
| 30 | 1 | 42 |

As shown in Table 4, the results indicate that when the ratio of the device cross-section area to the yoke area is 30% or more and the yoke height is 10 μm or less, more excellent reading characteristics can be obtained.

Example 3

A magnetic head having the same structure as shown in FIGS. 9 and 10 was produced. In this magnetic head, the yoke is formed on the magnetoresistive device. Hereinafter, a production method will be described with reference to FIG. 11.

First, Ta(3)/Cu(500)/Ta(3)/PtMn(30)/CoFe(3)/Ru(0.7)/ CoFe(3)/Al(0.4; 1 min. oxidation with pure oxygen with 260 Torr)/Al(0.3; 1 min. oxidation with pure oxygen with 260 Torr)/CoFe(3)/NiFe(30)/Ta(3) were formed in this order on an AlTiC plate as a substrate 1, and annealed at 260° C. for 2 hours (FIG. 11A). The Cu layer was a lower electrode, and PtMn(30)/CoFe(3)/Ru(0.7)/CoFe(3) was the first magnetic layer 31 as the pinned layer. The Al oxide film was the non-magnetic layer 32. The CoFe(3)/NiFe(30) was the second magnetic layer 33 as the free layer.

Figure 26:
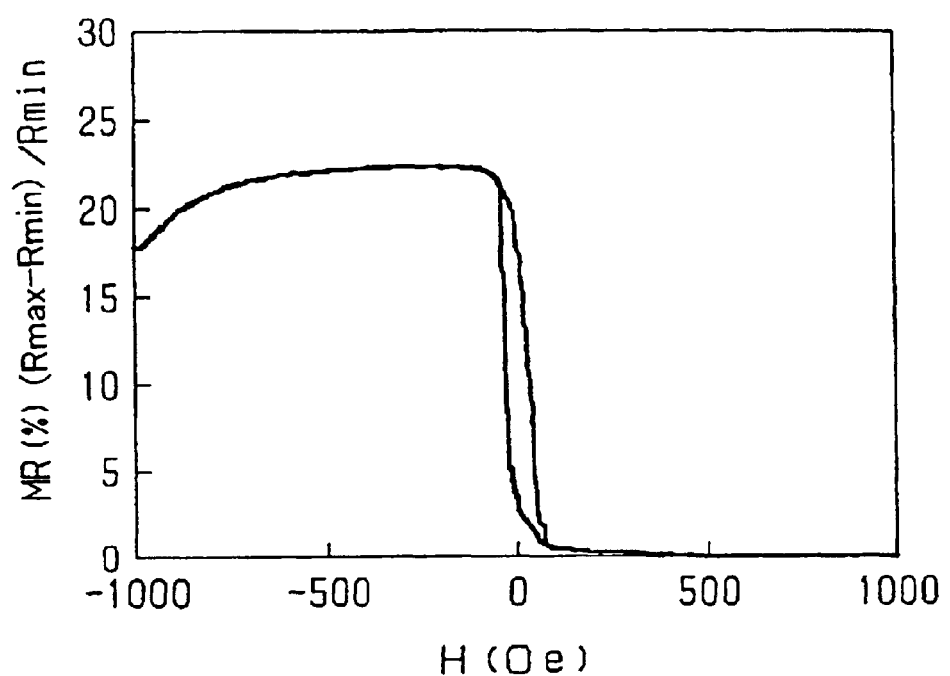
FIG. 26 is a view showing an example of the MR curve of a magnetic head of the present invention.

When a voltage was applied to this layers from a cross electrode of 3×3 $\mu m^2$, the MR curve shown in FIG. 26 was obtained, and the junction resistance was 25 $\Omega/\mu m^2$.

Then, this film was ion milled to a length of 2 μm and a width (in the direction of the normal line of the paper face) of 0.6 μm, and then alumina was formed as the interlayer insulating film 6 (FIG. 11B). Furthermore, a resist on the device was lifted off, and then a $SiO_2$ film 11 with a thickness of 1 μm was formed (FIG. 11C). Then, using RIE, the $SiO_2$ film was removed 500 nm each from both ends of the device and NiFe was exposed by milling (FIG. 11D). Then, a Ta film having a thickness of 3 nm was formed on the side of the $SiO_2$ film with a carousel type sputtering apparatus swinging ±90° with respect to the surface of the substrate, and NiFe was electrodeposited to 3 nm on the Ta film by electroless plating. Furthermore, the $SiO_2$ film 11 was coated to produce the magnetic material 12 for the yoke (FIG. 11E). Finally, terminals were provided on this magnetic material and the lower electrode (Cu) and connected to a constant current source 8 and a voltage meter 7, and a magnetic gap 5 with a width of 20 nm was formed by FIB, and an alumina film was formed in this gap (FIG. 11F; alumina was not shown).

When an external magnetic field was applied to the vicinity of the gap of the thus produced magnetic head, the same hysteresis as that in the range of ±100 Oe in FIG. 26 and the MR values were obtained. Furthermore, when a heat treatment for orthogonalization was performed at 200° C. for one hour in the direction perpendicular to the paper face of FIG. 10, the hysteresis became even smaller, and excellent linear response with respect to a small external magnetic field was exhibited. Thus, when the magnetization direction of the magnetic material constituting the yoke is controlled by being polarized to be approximately perpendicular to the direction of the magnetic flux path of the yoke, the soft properties and the linearity of the head characteristics are improved.

It is believed that these excellent head characteristics can be attributed to the fact that PtMn as an antiferromagnetic material was formed in a stage where the roughness of the underlying layers was comparatively small. Furthermore, since the yoke is formed on the magnetoresistive device, and the ratio of the device cross-section area of the magnetoresistive device to the yoke area is 100%, an external magnetic field is induced sufficiently in the device.

Figure 25:
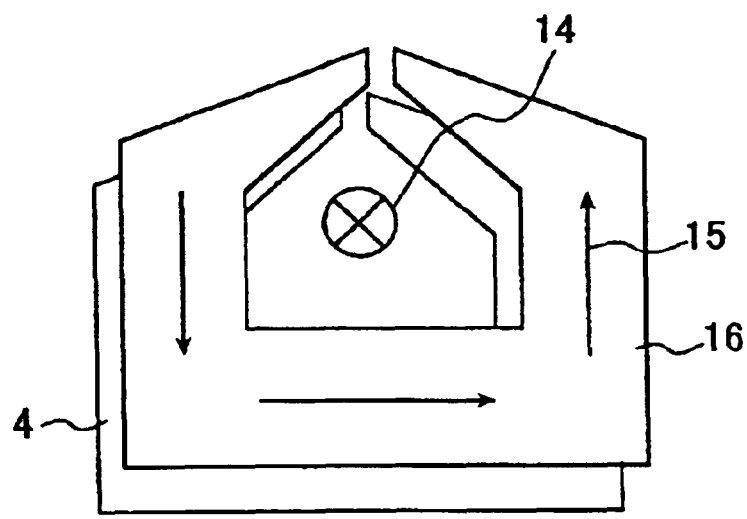
FIG. 25 is a view showing an example a method for polarizing a magnetic head.

The same excellent head characteristics as above can be obtained from a magnetic head having the structure shown in FIG. 5 in which the yoke plane is parallel to the surface of the substrate. The PtMn of the magnetic head shown in FIG. 5 was polarized, using a magnetic field developed by current 14 flowing in the direction perpendicular to the paper face, as shown in FIG. 25. The magnetization direction of the yoke was controlled, using a magnetic field developed by current 15 flowing along the magnetic flux path of the yoke. A conductive layer 16 formed in the direction of the magnetic flux path can be used not only for polarization, but also SAL (soft adjacent layer) bias.

Example 4

A magnetic head shown in FIG. 12 was produced in the same manner as in Example 3, except that a NiFe layer was added as a magnetic shield.

Magnetic information recorded on a disk using a FeP medium was reproduced, instead of a small magnetic field of Example 3. In this example, the recorded bit size on the medium is 30 nm in the circumference direction of the track, and 0.21 μm in the width direction of the track. The linear recording density and the track density were about 835 kBPI and 120 kTPI, respectively. The data error rate when data are read out on one track is $10^{-8}$ or less. This is far better than the data error rate of the head of Example 3 having the same gap width, which is $10^{-7}$. The data transfer rate was 200 Mbits/sec., the flying height of the head was 10 nm. Both the medium and the yoke were grounded so that noise at the time of contact was reduced significantly.

In this example, a magnetic shield that shields the magnetic flux leaked from neighboring recorded bits in the circumference direction of the track has been described. However, when magnetic shields are arranged so as to sandwich the magnetic head from the direction perpendicular to the paper face, a magnetic field leaked from neighboring tracks can be shielded. This structure can achieve a data error rate of about $10^{-8}$ or less, even if the track gap is narrowed for high density recording.

Example 5

Ta(3)/Cu(500)/Ta(3)/PtMn(30)/CoFe(3)/Ru(0.7)/CoFe (3)/Al(0.4; 1 min. oxidation with pure oxygen with 200 Torr)/Al(0.3; 1 min. oxidation with pure oxygen with 200 Torr)/CoFe(1)/NiFe(15)/Ru(X)/NiFe(15)/Ta(3) were formed in this order on a Si substrate provided with a thermal oxide film. X is a thickness shown in Table 5.

Thus, a regular cross electrode of 1×3 $\mu m^2$ in which an Al oxide layer was the non-magnetic layer was produced. This film has the structure shown in FIG. 16, and the first magnetic layer 31 corresponds to CoFe/Ru/CoFe, the non-magnetic layer 32 corresponds to the Al oxide layer, and the second magnetic layer 33 corresponds to CoFe/NiFe/Ru(X)/NiFe. A heat treatment was performed while applying a magnetic field in the longitudinal direction of the device using the cross electrode, and this direction was used as the uniaxial anisotropic direction of PtMn.

The MR curve was measured, and Table 5 shows the obtained coercivity and the MR ratio.

TABLE 5

| Ru thickness(nm) | MR ratio(%) | Coercivity Hc(Oe) |
| --- | --- | --- |
| 0 | 4 | 38 |
| 0.3 | 5 | 32 |
| 0.6 | 4 | 35 |
| 0.9 | 5 | 42 |
| 1.2 | 10 | 15 |
| 2.0 | 15 | 1 |
| 5.0 | 13 | 0.7 |
| 10.0 | 11 | 1 |
| 20.0 | 9 | 1.5 |
| 50.0 | 9 | 2 |

When the thickness of the Ru layer was in the range of 0.6 to 0.9 nm, the exchange coupling was dominant, so that the hysteresis of the MR curve was large. When the thickness of the Ru layer was in the range of 2 to 10 nm, the soft properties were higher than when the Ru layer was not provided (thickness=0 nm), and the Hc of the film was 1 Oe or less.

When the magnetic domain was examined by a Lorenz microscopy, it was confirmed that when the thickness of the Ru layer was in the range of 2 to 10 nm, magnetizations were aligned alternately in the direction of the minor axis in no magnetic field. This is believed to be because magnetostatic coupling was dominant. Furthermore, close observation of the cross section confirmed that the magnetization directions of most of the magnetic films under the Ru film were antiparallel to those of the magnetic films thereabove, and the directions of some films were parallel.

Next, using this film, a magnetic head with the shape shown in FIG. 5 was produced and PtMn was polarized by the magnetic field developed by the current 14 flowing in the direction perpendicular to the paper face shown in FIG. 25. Then, a small magnetic field was applied to the vicinity of the magnetic gap, and the MR ratio was measured. In this case as well, when the thickness of the Ru layer was 2 to 10 nm, the highest MR ratio was obtained. This value was comparable to that when applying a bias magnetic field to the free layer by the yoke type current of FIG. 25, although no bias was applied in the magnetization direction of CoFe/NiFe/Ru/NiFe as the free layer. When the yoke was observed by a Lorenz microscopy in this case, it was confirmed that the magnetization direction formed an angle of about 90° with respect to the direction of the magnetic flux path of the yoke.

Furthermore, a film having a structure of Ta(3)/Cu(500)/Ta(3)/NiFe(15)/Ru(X)/NiFe(15)/CoFe(1)/Al(0.4; 1 min. oxidation with pure oxygen with 200 Torr)/Al(0.3; 1 min. oxidation with pure oxygen with 200 Torr)/CoFe(3)/Ru(0.7)/CoFe(3)/PtMn(30)/Ta(3) on a Si substrate provided with a thermal oxide film was used to produce a magnetic head in which the magnetoresistive device shown in FIGS. 17 and 18 was on the yoke. When the characteristics of this magnetic head were examined with a small magnetic field, excellent MR ratios and linearity were obtained as in the above example.

Example 6

Figure 6:
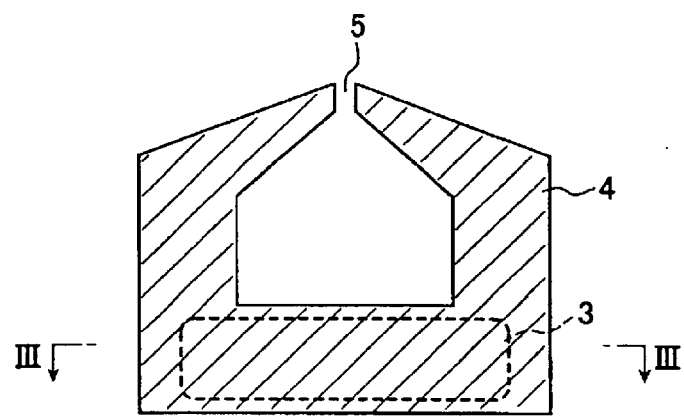
FIG. 6 is a plan view showing an arrangement of a yoke and a magnetoresistive device in still another embodiment of a magnetic head of the present invention.
Figure 7:
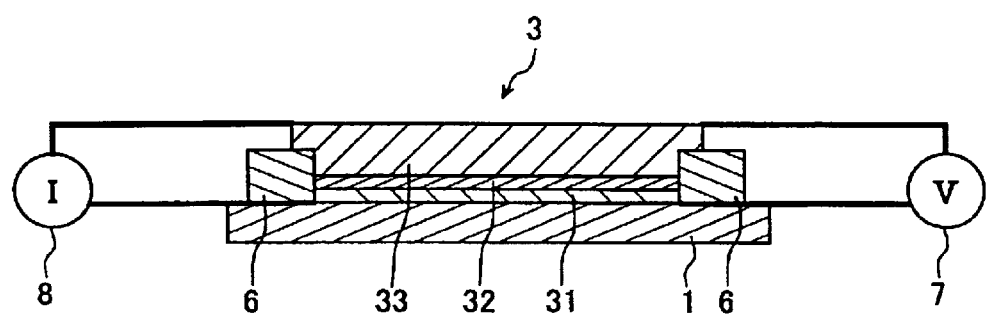
FIG. 7 is a cross-sectional view of the magnetic head taken along line III—III of FIG. 6.
Figure 27A:
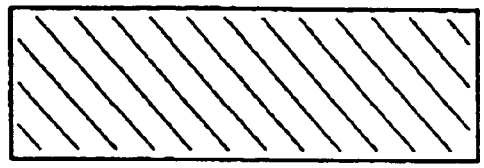
FIGS. 27A to 27E are views illustrating plane shapes of free layers of magnetoresistive devices.
Figure 27B:
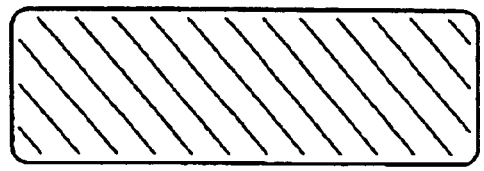
Figure 27C:
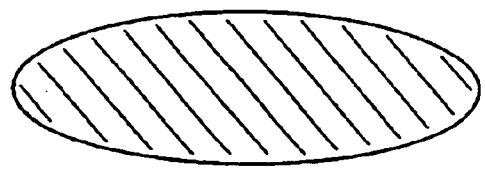
Figure 27D:
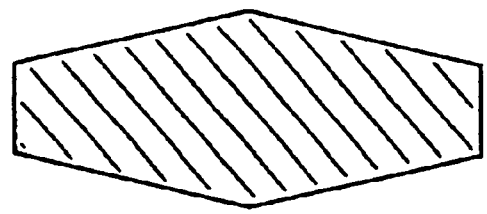
Figure 27E:
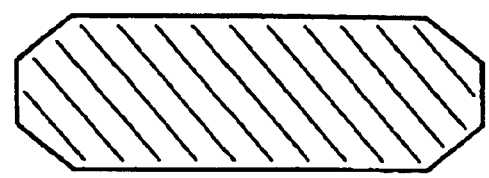

The head efficiency of the magnetic head shown in FIGS. 1 and 2 and the magnetic head shown in FIGS. 6 and 7 was examined when the magnetoresistive device was shaped into those shown in FIGS. 27A to 27E (the device shapes in the embodiments of FIGS. 1 and 6 correspond to that shown in FIG. 27B). The ratio of the device cross-section area to the yoke area was the same in all the cases.

A small alternating magnetic field with 1 MHz or 500 MHz was applied to the vicinity of the magnetic gap, and changes in the MR characteristics and the voltage output when the same current flows were measured. Tables 6 and 7 show the results.

TABLE 6

Magnetic head shown in FIGS. 1 and 2

| | MR ratio(%) | |
| --- | --- | --- |
| Device shape | 1 MHz | 500 MHz |
| Rectangle (FIG. 27A) | 1 | 0.1 |
| Approximate rectangle (FIG. 27B) | 6 | 2 |
| Ellipse (FIG. 27C) | 7 | 3 |
| Hexagon (FIG. 27D) | 6 | 2 |
| Octagon (FIG. 27E) | 7 | 3 |

TABLE 7

Magnetic head shown in FIGS. 6 and 7

| | MR ratio(%) | |
| --- | --- | --- |
| Device shape | 1 MHz | 500 MHz |
| Rectangle (FIG. 27A) | 2 | 1 |
| Approximate rectangle (FIG. 27B) | 8 | 3 |
| Ellipse (FIG. 27C) | 8 | 4 |
| Hexagon (FIG. 27D) | 7 | 3 |
| Octagon (FIG. 27E) | 8 | 3 |

It was confirmed that in a high frequency band, higher characteristics were obtained with the magnetic heads having the shapes of FIGS. 27B to 27E than with the rectangular shape of FIG. 27A. This is believed to be because the magnetization response of the free layer was higher when the corner portions were obtuse-angled or curved. In magnetic heads other than the above examples, the same tendency was confirmed.

Example 7

The magnetic head of the present invention was examined by comparing a recording medium using a concentric circular recording method as shown in FIG. 28A used in a regular HDD and a recording medium using a helical recording method as shown in FIG. 28B. The results were as follows. When a recording medium in which tracks were formed helically was used, the seek time occurring at the time of waiting for the head to move between tracks was reduced significantly, and in particular, it becomes possible to perform continuous reading of dynamic images or the like at high speeds. In particular, when the heads having excellent reading characteristics of the present invention are used, the linear recording density is improved so that an apparatus for replaying dynamic images for mobile applications that is substantially compact and resistant in a vibration environment can be realized.

Example 8

A magnetic head shown in FIGS. 1 and 2 was produced. The yoke was made of $Ni_{60}Fe_{40}$ having a thickness of 5 nm, and the structure of the magnetoresistive device was Ta(3)/ Cu(100)/Ta(3)/Ni$_{60}$Fe$_{40}$(20)/Al(0.4; 1 min. oxidation with pure oxygen with 200 Torr)/Al(0.3; 1 min. oxidation with pure oxygen with 200 Torr)/Co$_{75}$Fe$_{25}$(3)/Ru(0.7)/Co$_{75}$Fe$_{25}$(3)/PtMn (30)/Ta(3) formed in this order from the side of the substrate.

The above magnetoresistive device where the free layer corresponds to Ni$_{60}$Fe$_{40}$ (10) is denoted as device a.

On the other hand, magnetic heads shown in FIGS. 22 and 23 having a structure where a magnetic gap separates the magnetoresistive device from the yoke were produced. The yoke and the magnetoresistive device had the same structures as above, but the free layer was a multilayered film as follows.

Device b: Ni$_{60}$Fe$_{40}$(3)/CO$_{70}$Fe$_{30}$(1)/Ni$_{60}$Fe$_{40}$(3)
Device c: Ni$_{60}$Fe$_{40}$(5)/Co$_{70}$Fe$_{30}$(0.5)/Ru(0.7)/Co$_{70}$Fe$_{30}$(0.5)/Ni$_{60}$Fe$_{40}$(3)
Device d: Ni$_{60}$Fe$_{40}$(5)/CO$_{70}$Fe$_{30}$(0.5)/Ru(1.0)/CO$_{70}$Fe$_{30}$(0.5)/Ni$_{60}$Fe$_{40}$(3)
Device e: Ni$_{60}$Fe$_{40}$(5)/Co$_{70}$Fe$_{30}$(0.5)/Ru(1.2)/CO$_{70}$Fe$_{30}$(0.5)/Ni$_{60}$Fe$_{40}$(3)
Device f: Ni$_{60}$Fe$_{40}$(3)/Co$_{70}$Fe$_{30}$(0.5)/Ru(1.0)/Co$_{70}$Fe$_{30}$(0.5)/Ni$_{60}$Fe$_{40}$(3)
Device g: Ni$_{60}$Fe$_{40}$(5)/Co$_{70}$Fe$_{30}$(0.5)/Ir(0.2)/Co$_{70}$Fe$_{30}$(0.5)/Ni$_{60}$Fe$_{40}$(3)
Device h: Ni$_{60}$Fe$_{40}$(3)/Co$_{70}$Fe$_{30}$(0.5)/Ir(0.2)/Co$_{70}$Fe$_{30}$(0.5)/Ni$_{60}$Fe$_{40}$(3)
Device i: Ni$_{60}$Fe$_{40}$(5)/Co$_{70}$Fe$_{30}$(0.5)/Ir(0.1)/Co$_{70}$Fe$_{30}$(0.5)/Ni$_{60}$Fe$_{40}$(3)
Device j: Ni$_{60}$Fe$_{40}$(10)/Co$_{70}$Fe$_{30}$(0.5)/Ru(0.7)/CO$_{70}$Fe$_{30}$(0.5)/Ni$_{60}$Fe$_{40}$(3)

The MR ratio with a small external magnetic field was measured with respect to each magnetic head. Table 8 shows the results.

TABLE 8

| Magnetic head | Device | MR ratio(%) |
| --- | --- | --- |
| No gap | a | 7 |
| Gap provided | b | 2 |
| Gap provided | c | 15 |
| Gap provided | d | 14 |
| Gap provided | e | 3 |
| Gap provided | f | 0.1 |
| Gap provided | g | 12 |
| Gap provided | h | 0.2 |
| Gap provided | i | 3 |
| Gap provided | j | 6 |

When the MH curve was measured with a vibrating sample magnetometer (VSM), in the devices c, d, f, g, h, e, i, and j, the spin flop peculiar to the antiferromagnetic coupling was observed.

On the other hand, in devices e and i in which the thickness of the non-magnetic film is less than 0.2 nm or more than 1.0 nm, the antiferromagnetic coupling was weak and the MH curve was substantially the same as that of device b. In these devices, the MR ratio was low.

In devices f and h, the MR ratio was low, although the antiferromagnetic coupling was observed. In these devices, the magnetization of the free layer was not observed until the magnetic field reaches several hundreds Oe or more where the spin flop occurred. It is believed that this was because the magnetic moments of the magnetic layers that are coupled antiferromagnetically via the non-magnetic layer were almost completely canceled, and no magnetization rotation by the magnetic field induced from the yoke occurred.

In device j, due to the thickness (10 nm) of the thickest magnetic layer (Ni$_{60}$Fe$_{40}$ film on the substrate side) of the films constituting the free layer, compared with the yoke height (5 nm), the response of the free layer with respect to the external magnetic field was not sufficient and the MR ratio was low.

On the other hand, in devices c, d, and g, higher MR ratios than that of device a were obtained, although the magnetic gap was provided.

Example 9

Figure 29:
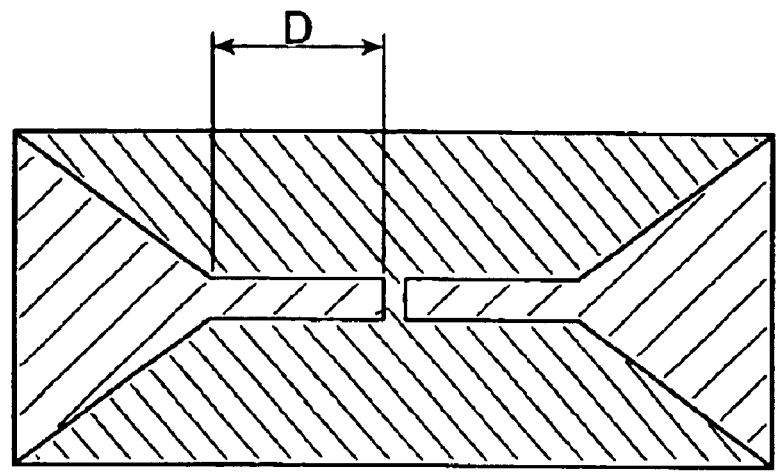
FIG. 29 is a plan view of the magnetic head produced in Example 9.

In this example, magnetic heads having a ratio of the device cross-section to the yoke cross-section area of more than 100% were produced. More specifically, the ratio was adjusted by changing the yoke of the magnetic head shown in FIGS. 9 and 10 to that having a shape shown in FIG. 29 and changing the width D. In this example, as the magnetoresistive device, Cu/Ta(3)/NiFeCr(4)/PtMn(20)/CoFe(3)/Ru(0.8)/CoFe(3)/Al oxide film/NiFe(5) were formed, and NiFe (5) was used as the yoke.

A small magnetic field was brought close to each of the produced magnetic heads, and the MR changes were measured. Table 9 shows the results.

TABLE 9

| Device cross-section area/yoke area | MR ratio(%) |
| --- | --- |
| 150 | 28 |
| 200 | 26 |
| 300 | 25 |
| 350 | 17 |
| 400 | 12 |

As shown in Table 9, when the ratio of the device cross-section area to the yoke cross-section area exceeded 300%, the MR change was reduced significantly.

Example 10

In this example, magnetic heads provided with magnetoresistive devices where three magnetic layers and two non-magnetic layers were laminated alternately and additional magnetic gaps were produced. More specifically, the magnetic heads produced in this example were those shown in FIGS. 30, 31 and 32 with a magnetoresistive device having a structure of Ta(3)/Cu(50)/Ta(3)/NiFeCr(4)/PtMn (20)/CoFe(3)/Ru(0.8)/CoFe(3)/Al oxide film/NiFe(5)/Al oxide film/CoFe(3)/Ru(0.8)/CoFe(3)/PtMn(20)/Ta(3) formed in this order from the side of the substrate. For comparison, magnetic heads using a magnetoresistive device obtained by laminating Ta(3) /Cu(50)/Ta(3)/NiFeCr (4)/PtMn(20)/CoFe(3)/Ru(0.8)/CoFe(3)/Al oxide film/NiFe (5)/Ta(3) were produced. Also in this example, the Al oxide film was used as the non-magnetic layer.

When conditions for optimal outputs were sought while applying an external magnetic field to each of the produced magnetic head, the results were as follows. In all the magnetic heads using the device including two non-magnetic layers, an output of about 200 mV (a voltage between Ta at both ends of the device was 900 mV) was obtained, whereas in magnetic heads including only one non-magnetic layer, the output was at most about 60 mV (the above-described voltage was 400 mV).

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic head comprising:

a magnetoresistive device including a laminate structure in which a non-magnetic layer is interposed between a first magnetic layer and a second magnetic layer, a yoke for introducing an external magnetic field from a magnetic gap to the magnetoresistive device;

a current introducing part for allowing current to flow between the first magnetic layer and the second magnetic layer via the non-magnetic layer;

a measuring part for detecting a change in resistance occurring between the first magnetic layer and the second magnetic layer in accordance with a relative magnetization angle between the first magnetic layer and the second magnetic layer that is changed by the external magnetic field induced via the yoke; and a substrate over which the magnetoresistive device and the yoke are formed, wherein at least one magnetic gap is formed between a part of the yoke provided so as to constitute at least a part of one magnetic layer selected from the first magnetic layer and the second magnetic layer and a remaining part of the yoke, and the one magnetic layer is a layer in which magnetization rotation is caused more easily by external magnetization than in the other magnetic layer, and the one magnetic layer comprises at least two magnetic films and at least one non-magnetic film that are laminated alternately, the pair of adjacent magnetic films are coupled antiferromagnetically via the non-magnetic film, and a magnetic moment is not closed in the at least two magnetic films.

2. The magnetic head according to claim 1, wherein a thickness of the non-magnetic film is not less than 0.2 nm and not more than 1.0 nm.

3. The magnetic head according to claim 1, wherein a thickness of the remaining part of the yoke is larger than a thickness of the thickest magnetic film, the thickness being taken at the planes where the part of the yoke and the remaining part border on the magnetic gap.

4. The magnetic head according to claim 1, wherein the non-magnetic layer is made of an insulator or a semiconductor.

5. The magnetic head according to claim 1, wherein a magnetization direction of a magnetic material constituting the yoke is approximately perpendicular to an extension direction of a magnetic flux path generated in the yoke by the external magnetic field introduced to the yoke.

6. The magnetic head according to claim 1, wherein a magnetic layer that is either one selected from the first magnetic layer and the second magnetic layer and in which magnetization rotation is caused more easily by external magnetization than in the other magnetic layer has a shape without acute-angled or right-angled corners, the shape being viewed along a direction perpendicular to a surface of the substrate.

7. A magnetic information recording/reproducing apparatus comprising the magnetic head according to claim 1.

* * * * *